(12) United States Patent
Lancaster et al.

(10) Patent No.: US 9,325,588 B2
(45) Date of Patent: Apr. 26, 2016

(54) EVENT SUPPRESSION METHOD AND SYSTEM

(71) Applicant: NetApp, Inc., Sunnyvale, CA (US)

(72) Inventors: Larry Lancaster, Alamedon, CA (US); Milan Bag, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 420 days.

(21) Appl. No.: 13/794,431

(22) Filed: Mar. 11, 2013

(65) Prior Publication Data

US 2014/0095699 A1  Apr. 3, 2014

Related U.S. Application Data

(62) Division of application No. 11/964,034, filed on Dec. 25, 2007, now Pat. No. 8,417,809.

(51) Int. Cl.
*H04L 12/26* (2006.01)
*G06F 11/07* (2006.01)

(52) U.S. Cl.
CPC ........... *H04L 43/04* (2013.01); *G06F 11/0727* (2013.01); *G06F 11/0781* (2013.01)

(58) Field of Classification Search
CPC .. G06F 11/0727; G06F 11/0781; H04L 43/04
See application file for complete search history.

(56) References Cited

U.S. PATENT DOCUMENTS

| | | | |
|---|---|---|---|
| 5,944,782 A | 8/1999 | Noble et al. | |
| 6,496,942 B1 | 12/2002 | Schoenthal et al. | |
| 6,728,897 B1 | 4/2004 | Cramer et al. | |
| 7,249,356 B1 | 7/2007 | Wilson et al. | |
| 7,263,553 B2 * | 8/2007 | Gaspard | H04L 63/1458 709/223 |
| 7,392,311 B2 | 6/2008 | Grabarnik et al. | |
| 7,408,458 B1 * | 8/2008 | Sheleheda et al. | 340/506 |
| 7,617,074 B2 | 11/2009 | Beish et al. | |
| 8,156,306 B1 | 4/2012 | Raizen et al. | |
| 2003/0023408 A1 | 1/2003 | Wight et al. | |
| 2006/0036720 A1 | 2/2006 | Faulk | |
| 2008/0262875 A1 * | 10/2008 | Plavnik et al. | 705/3 |
| 2008/0284581 A1 * | 11/2008 | Sheleheda | H04L 41/0627 340/506 |
| 2009/0012748 A1 * | 1/2009 | Beish et al. | 702/187 |

* cited by examiner

*Primary Examiner* — Larry Donaghue
(74) *Attorney, Agent, or Firm* — Kacvinsky Daisak Bluni PLLC

(57) ABSTRACT

A method and system for managing and dynamically suppressing event notification is provided. The method and system receives an indication of an event from a storage environment to be processed by a support system according to a set of default delivery parameters. Next, the method and system determines if one or more event specific delivery parameters have been associated with the event. If this is the case, then the method and system modifies the default delivery parameters for the information associated with the event according to the one or more event specific delivery parameters. These event specific delivery parameters are also used to determine when to transmit a notification of the event to the support system. The dynamic suppression of events combines events gathered into an event log together into a set of one or more recurring events. From these events, the method and system then identifies a high frequency subset as one or more recurring events considered to occur at a higher frequency compared with a low frequency subset having one or more recurring events that occur at a lower frequency. Based on this information gathered, the method and system then eliminates a portion of the events in the high frequency subset until the frequency of events in the high frequency subset approximates the frequency of events in the low frequency subset.

22 Claims, 8 Drawing Sheets

⋮

```

# asuptrigger=asup.msg.cli.doit                    \
#      autosupport.support.to.content=complete     \
#      autosupport.support.to.timer=0              \
#      autosupport.to.content=complete             \
#      autosupport.to.timer=300                    \
#      autosupport.noteto.content=pager            \
#      autosupport.noteto.timer=300

```

EVENT SUPPRESSION METHOD AND SYSTEM

CROSS REFERENCE TO RELATED APPLICATIONS

The present application is a divisional of co-pending and commonly assigned U.S. patent application Ser. No. 11/964,034, entitled "EVENT SUPPRESSION METHOD AND SYSTEM," filed Dec. 25, 2007, the disclosure of which is hereby incorporated herein by reference.

INTRODUCTION

Computer and storage environments perform a variety of complex operations that need careful monitoring. To keep track of these operations, applications in these systems record information in an event log concerning the progress and potential problems encountered. Generally, the applications running on the computer and storage environments detect a certain set of conditions or events and then generate information corresponding to the event to facilitate tracking the condition or event at a later point in time.

Event information in some cases may indicate a normal progression towards the completion of certain tasks in the computer or storage environment. These events may be used in determining that a system is operating normally and performing certain expected functions. Other event information may instead indicate that a system is slowly or abruptly failing and corrective action may be needed to avert further problems. In either case, the event information helps ensure systems operate with a high degree of reliability, availability and serviceability.

Various computer-based support systems have been created to gather and manage the event information in these logs. Events occurring in the storage environment developed by Network Appliance, Inc of Sunnyvale, Calif. incorporate a more sophisticated support system referred to as an Autosupport system. Applications running in their storage environment log event information and also send alerts to the Autosupport system. These alerts may be stored remotely for immediate consideration by support personnel employed or contracted by Network Appliance. The Autosupport system receives these alerts with the event information and performs one or more support functions in response. In some cases, the Autosupport system may send an automated message to the customer indicating a number of options ranging from an imminent system failure to perhaps an incorrect configuration condition. It is possible a corrective solution is also suggested along with the message to the customer. In some cases, support personnel may phone, travel to a customer site to repair a system or interactively contact the customer to assist with analyzing the event information and proposing solutions.

Unfortunately, an excessive number of events and event information may be generated as the number of applications running on computer and storage environments increase. Event logs storing the event information may rapidly fill and quickly need archiving. Conventional approaches to archive data include rotating logs, tailing the last portion of the logs or overwriting the logs are generally not acceptable. For example, a conventional support system may use "tailing" to reduce the size of a log having thousands of entries to only 200 entries by deleting all but the last 200 entries in the "tail" of the log.

In general, support systems using a conventional approach to managing these event logs may also eliminate critical information or make information difficult to obtain. For example, tailing may reduce the size of an event log to only the last several hundred entries but it also eliminates the preceding entries and information. This makes trouble shooting on computer and storage environments difficult as the entries and values in the event log are limited.

Managing event logs is also difficult problem to solve in advance since the frequency and volume of event information may change depending on the particular computer or storage environment installation. For example, the frequency of events may depend on dynamically changing data conditions on a system that may vary depending on the time of operation. Overall, it is difficult to determine the importance of entries within event logs in advance.

For these and other reasons, it is therefore desirable to create an improved system and method of managing event information entered into event logs and related transmission of events to support systems monitoring these events.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein:

FIG. 5 contains an excerpt of a configuration file having configurable parameter entries for a named event in accordance with one implementation of the present invention;

SUMMARY OF THE INVENTION

Figure 1:
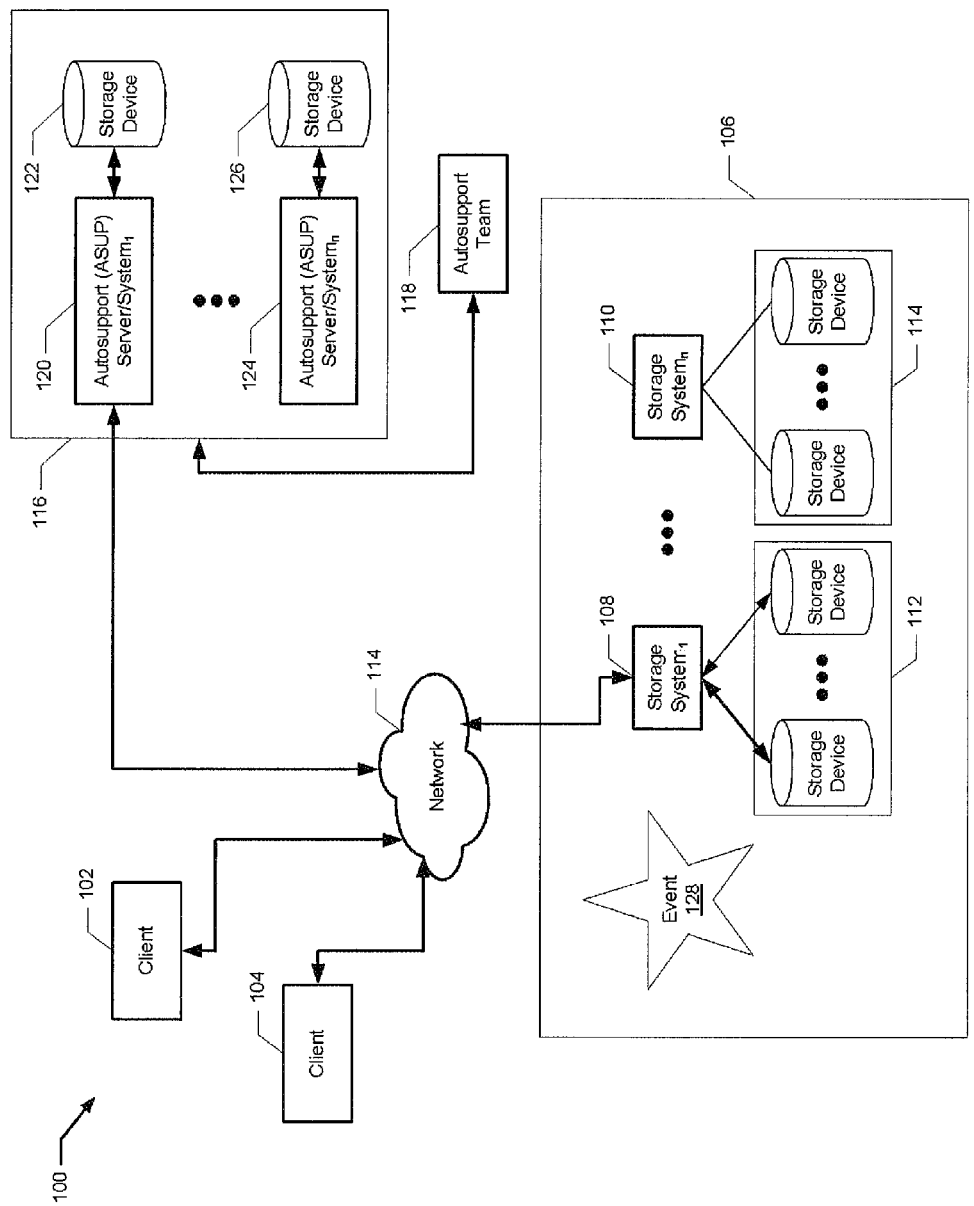
FIG. 1 is a schematic block diagram of an exemplary system providing storage and support in accordance with aspects of the present invention.

Aspects of the present invention provide a method and system of managing notification of events associated with a storage environment. The management method and system includes receiving an indication of an event from the storage environment to be processed by a support system according to a set of default delivery parameters. The default delivery parameters generally indicate that all events or no events should be processed. Next, the method and system determines if one or more event specific delivery parameters have been associated with the event. For example, a named event may have particular delivery parameters specified in a file or a registry. If this is the case, then the method and system modifies the default delivery parameters for the information associated with the event according to the one or more event specific delivery parameters. These event specific delivery parameters may also used to determine when to transmit a notification of the event to the support system.

Another aspect of the present invention provides a method and system for dynamically suppressing events associated with a storage environment. The method and system combine events gathered into an event log together into a set of recurring events. From these recurring events, the method and system then identifies a high frequency subset as including recurring events considered to occur at a higher frequency compared with a low frequency subset having one or more recurring events that occur at a lower frequency. Based on this information gathered, the method and system then eliminates a portion of the events in the high frequency subset until the frequency of events in the high frequency subset approximates the frequency of events in the low frequency subset.

DETAILED DESCRIPTION

Aspects of the present invention provide an improved approach for managing the growth of log files as used in computers and storage environments. Benefits provided by aspects of the present invention include, but are not limited to, one or more of the following mentioned herein below. In storage environments, log files may receive many hundreds of entries in a short period of time as a result of events occurring on both software and/or hardware components of the storage environment. These events not only have the potential for filling logs locally but also may overwhelm other support systems and people processing/analyzing these events. Instead of truncating or rotating logs or other similar approach, aspects of the present invention dynamically suppresses the number of entries being generated thus reducing the aggregate number of actual events. This has the benefit of reducing the overall number of events generated yet allows important events to be stored for later analysis and consideration.

It is also contemplated and recognized that certain processes or threads running in association with a storage environment may generate a disproportionate number of events when compared with other threads of execution. This makes it difficult to provide a static cap or limit to the number of events any particular application may generate. Instead, aspects of the present invention consider the overall number of events being generated in real-time and limit those events generated at a much higher frequency. Actual events and conditions occurring in a storage environment may change over time yet will be dynamically moderated in accordance with aspects of the present invention.

Further, aspects of the present invention allow certain specific delivery parameters for events to be adjusted as needed on the storage environment. Each event generated by the storage environment is named and delivered according to a set of configuration parameters setup in advance. Events generated by the storage environment can be tailored to accommodate the needs and conditions associated with the storage environment. The size of the event logs can be directly reduced by turning off or limiting the generation of certain events. The system for logging these events does not need to be completely turned off to limit event generation since each event can be individually configured.

FIG. 1 is a schematic block diagram of an exemplary system 100 providing storage and support systems in accordance with aspects of the present invention. System 100 in FIG. 1 includes clients 102/104, storage environment 106, an Autosupport system 116 and an Autosupport team 118 that may intervene or respond as notices of events from storage environment 106 may be transmitted to the Autosupport system 116. It can be appreciated that Autosupport system 116 is one support system designed and used by Network Appliance, Inc. of Sunnyvale, Calif. using implementations of the present invention. Alternate implementations of the present invention can be applied to other support systems that manage and process local logs, remote logs and any other types of logs regardless of the number of entries being made in these logs and the type of computer, storage or other system placing event entries in the logs.

Clients 102/104 may be computers or other computer-like devices capable of accessing storage environment 106 either directly or indirectly over a network 114. In general, clients 102/104 may access storage environment 106 over network 114 using wireless or wired connections supporting one or more point-to-point links, shared local area networks (LAN), wide area networks (WAN) or other access technologies. These clients 102/104 may be accessing data, applications, raw storage or various combinations thereof stored on storage environment 106.

Storage environment 106 includes one or more storage system represented as storage system 108 through storage system 110 and their corresponding storage devices 112 through storage devices 114. For example, storage system 108 (also referred to as filer 108) is a computer system that provides file and block access to the organization of information on storage devices 112, such as disks. Storage system 108 may include a storage operating system that implements a file system to logically organize the information as a hierarchical structure of directories and files on the disks. Each "on-disk" file may be implemented as a set of disk blocks configured to store information, As used herein, the term storage operating system generally refers to the computer-executable code operable on a storage environment that manages data access and client access requests and may implement file system semantics in implementations involving filers. In this sense, the Data ONTAP® storage operating system, available from Network Appliance, Inc. of Sunnyvale, Calif., which implements a Write Anywhere File Layout® (WAFL®) file system, is an example of such a storage operating system implemented as a microkernel within an overall protocol stack and associated disk storage. The storage operating system can also be implemented as an application program operating over a general-purpose operating system, such as UNIX® or Windows NT®, or as a general-purpose operating system with configurable functionality, which is configured for storage applications as described herein.

In one implementation, storage devices 112 and 114 may be implemented using physical storage disks having one or more storage volumes to define an overall logical arrangement of storage space. Some filer implementations can serve a large number of storage volumes that may exceed 150 discrete units, for example. A storage volume is "loaded" in storage system 108 or 110 by copying the logical organization of the volume's files, data and directories into memory of storage system 108 or 110. Once a volume has been loaded in memory of a storage system, the volume may be "mounted" by one or more users, applications, or devices as long as they are permitted to access its contents and navigate its namespace. As used herein, a volume is said to be "in use" when it is loaded in a filer's memory and at least one user, application, etc. has mounted the volume and modified its contents.

Each file and directory stored in a filer is typically identified by a file-handle identifier or "file handle." A file handle generally includes at least a volume identifier (V), a file identifier (F) and a generation number (G) that collectively describe a specific file or directory in the filer. The volume identifier indicates which storage volume in the filer contains the file or directory. The file identifier identifies the specific file or directory in the volume. For example, if the volume implements an inode-based file system, such as the WAFL® file system, the file identifier may correspond to an inode number of a file or directory within the volume. The generation number identifies a particular instance of the file or directory in the volume. For instance, if different versions of the same file are stored in the volume, each may be differentiated from the others by its corresponding generation number. In general, the largest generation number for a file or directory corresponds to its most recent version. It is contemplated that file handles may also include other information besides a volume identifier, file identifier and generation number. Accordingly, it is further contemplated that a variety of different file-handle implementations are envisioned to be within the scope of the present invention.

As illustrated in FIG. 1, storage systems like storage system 108 may be configured to operate according to a client/server model of information delivery thereby allowing multiple clients, such as client 102 and client 104, to access files simultaneously. In this model, client 102 may be a computer running an application, such as a file-system protocol, that connects to storage system 108 over a network 114 with one or more of the aforementioned network protocols, such as point-to-point links, shared LAN, WAN, or VPN as implemented over a public network such as the Internet. Communications between storage system 108 and client 102 is typically embodied as packets sent over the computer network. Each client may request the services of storage system 108 by issuing file-system protocol messages formatted in accordance with a conventional file-system protocol, such as the Common Internet File System (CIFS) or Network File System (NFS) protocol.

For example, client 102 and client 104 are configured to communicate with a file-access protocol engine of storage system 108 using a stateful or stateless file-system protocol. A stateful protocol, such as CIFS protocol, is a connection-oriented protocol that requires storage system 108, e.g., the file-access protocol engine, and client 102 and client 104 to establish a communication session (or "virtual circuit") through which they exchange information. Each communication session is then associated with session-specific "state" information, which may include, inter alia, authentication information, session identifiers, file-handle identifiers, and other related information. In the event the session is lost or interrupted, the state information for the communication session may be used to reestablish the session without having to re-authenticate client 102, client 104 or other clients as well as renegotiate many of the session parameters. Upon re-establishing the stateful-protocol session, storage system 108 typically invalidates the client's outstanding file handles and issues a new set of file handles to the client. Thus, any client requests that were lost as a result of the session failure can be "replayed" by client 102, client 104 using the new set of file handles.

In contrast, a stateless protocol, such as the NFS protocol, does not require establishment of a formal communication session. Instead, requests from client 102, client 104 or other clients in a stateless protocol are authenticated and processed by the storage system 108 on a per-request basis rather than a per-session basis. That is, the validity of a client request in a stateless protocol is not bound to the duration of any specific communication session. Thus, unlike file handles used in stateful protocols, file handles in stateless protocols may remain valid even after the storage system has been temporarily shutdown or disabled.

In operation, an event 128 may occur at some point in time during the operation of one or more storage systems 108 through 110. Event 128 may occur as the result of routine system status checks or more serious and imminent failures requiring more immediate attention. Various applications on storage environment 106 monitor a range of conditions and generate event information corresponding to the particular event 128. Accordingly, an increasingly large number of events 128 may result in large amounts of event information to be entered into an event log kept on each respective storage system. If the conditions persist or repeatedly occur, some applications may attempt to generate and store event information in these logs so rapidly that the event log may grow to an unmanageable size.

Likewise, applications on storage environment 106 may also transmit large amounts of event information to the Autosupport system 116. It is contemplated that Autosupport system 116 has been designed and configured to not only support storage environment 106 but many other storage environments in other locations (not shown). Autosupport system 116 helps avert large scale system failures or problems thus increasing overall storage environment 106 availability and minimizing or reducing downtime. In response to a particular event 128, applications or threads running on storage environment 106 send corresponding event information for processing by one or more of Autosupport servers 120 through 124. These Autosupport servers 120 through 124 may reference other archived events held on storage devices 122 through 126 respectively as well as optionally receive guidance from one or more members of the Autosupport team 118 to determine a resolution or plan of action.

It is important that the applications and threads on storage environment 106 do not repeatedly transmit redundant event information to Autosupport system 116. For example, this may overwhelm Autosupport servers 120 through 124 and reduce their ability to adequately notify operation clients 102/104 or personnel managing storage environment 106 of corrective actions. Aspects of the present invention address this and other concerns by suppressing certain event information before it is generated and/or transmitted to Autosupport system 116 for storage in the event log.

Figure 2:
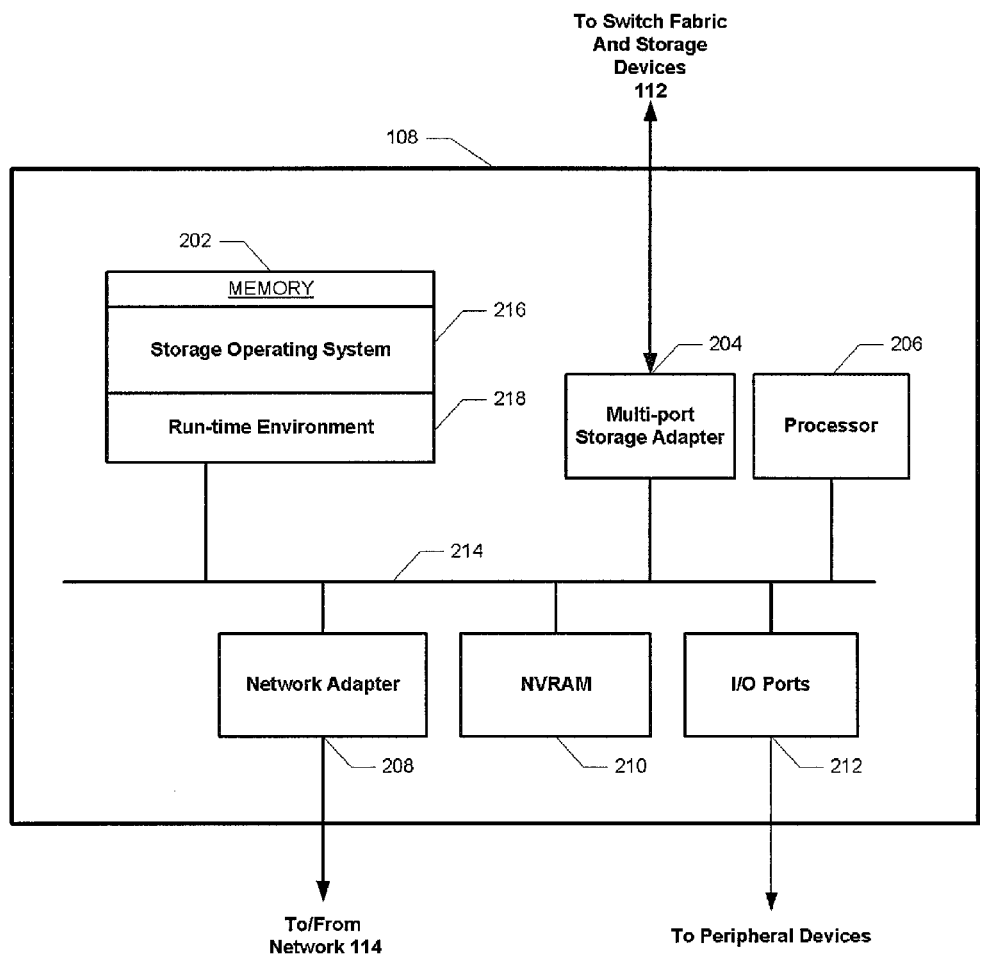
FIG. 2 is a schematic block diagram of storage system that may be advantageously used with one implementation of the present invention.

FIG. 2 is a schematic block diagram of storage system 108 that may be advantageously used with one implementation of the present invention. Storage system 108 includes a memory 202, a multi-port storage adapter 204, a processor 206, a network adapter 208, an NVRAM 210 and I/O ports 212 capable of communicating over interconnect 214. It is contemplated that aspects of the invention described herein may apply to any type of special-purpose computer (e.g., file serving appliance) or general-purpose computer, including a standalone computer, embodied as a storage environment. To that end, storage system 108 may be broadly, and alternatively, referred to as a component of the storage environment 106. Moreover, various aspects of the invention can be adapted to a variety of storage environment architectures including, but not limited to, a network-attached storage (NAS) environment, a storage area network (SAN) and disk assembly directly-attached to a client/host computer. The term "storage environment" should, therefore, be taken broadly to include such arrangements and combinations thereof.

The network adapter 208 comprises the mechanical, electrical and signaling circuitry needed to connect the storage system 108 to client 102/104 over network 114, which may include a point-to-point connection or a shared medium, such as a LAN. Clients 102/104 may be a general-purpose computer configured to execute applications, such as a file-system protocol. Moreover, clients 102/104 may interact with the storage system 108 in accordance with a client/server model of information delivery. That is, clients 102/104 may forward requests for the services of storage system 108, and storage system 108 may return the results of the services requested by the client, by exchanging packets encapsulated by a protocol format over the network 114 (e.g., the Common Internet File System (CIFS) protocol or Network File System (NFS)).

The NVRAM 210 provides fault-tolerant backup of data, enabling the integrity of storage system transactions to survive a service interruption based upon a power failure, or other fault. The size of the NVRAM is variable, although it is typically sized sufficiently to log a certain time-based chunk of transactions (for example, several seconds worth). The NVRAM may store client requests corresponding to discrete client messages requesting file transactions such as "WRITE," "CREATE," "OPEN," and the like. Further, these entries may be logged in the NVRAM, typically according to the particular order they are completed. The use of the NVRAM for system backup and crash recovery operations is generally described in commonly assigned application Ser. No. 09/898,894, entitled "System and Method for Parallelized Replay of an NVRAM Log in a Storage Appliance" by Steven S. Watanabe et al. assigned to the assignee of the present invention and expressly incorporated herein by reference.

In the illustrative implementation in FIG. 2, memory 202 includes storage locations that are addressable by the processor and adapters for storing software program code and data. For example, memory 202 may include a form of random access memory (RAM) that is generally cleared by a power cycle or other reboot operation and classified as "volatile" memory. Processor 206 and various adapters may, in turn, comprise processing elements and/or logic circuitry configured to execute the software code and manipulate the data stored in the memory 202. The storage operating systems 216, portions of which are typically resident in memory and executed by the processing elements, functionally organizes storage system 108 by, inter alia, invoking storage operations in support of a storage service implemented by storage system 108. While storage operating system 216 may operate alone, it is also contemplated that storage operating system 216 may execute within a run-time environment 218 that may include a general purpose operating system or virtualization environments that help improve utilization and efficient allocation of hardware and computing resources on storage system 108. It will be apparent to those skilled in the art that other processing and memory means, including various computer readable media, may be used for storing and executing program instructions pertaining to the inventive techniques described herein.

Multi-port storage adapter 204 cooperates with the storage operating system 216 and optionally run-time environment 218 executing on storage system 108 to access information requested by the one or more clients. Resulting information may be stored on the storage devices 112 that are attached, via the multi-port storage adapter 204, to the storage system 108 or other nodes of a storage environment as defined herein. The multi-port storage adapter 204 includes input/output (I/O) interface circuitry that couples to the storage devices 112 over an I/O interconnect arrangement, such as a conventional high-performance, Fibre Channel serial link topology. One or more interconnects on the multi-port storage adapter 204 may be used to provide higher throughput and/or reliability. The information is retrieved by the multi-port storage adapter 204 and, if necessary, processed by the processor 206 (or the multi-port storage adapter 204 itself) prior to being forwarded over interconnect 214 to the network adapter 208, where the information is formatted into one or more packets and returned to a requesting client.

In one implementation, the storage devices 112 are arranged into a plurality of volumes, each having a file system associated therewith. The volumes each include one or more disks. Implementations of the present invention configure the physical disks of storage devices 112 into RAID groups so that some disks store striped data and at least one disk stores separate parity for the data, in accordance with a preferred RAID 4 configuration. However, other configurations (e.g. RAID 5 having distributed parity across stripes, RAID 0 mirroring and others) are also contemplated. In a typical implementation, a volume is implemented as a multiplicity of RAID groups.

Figure 3:
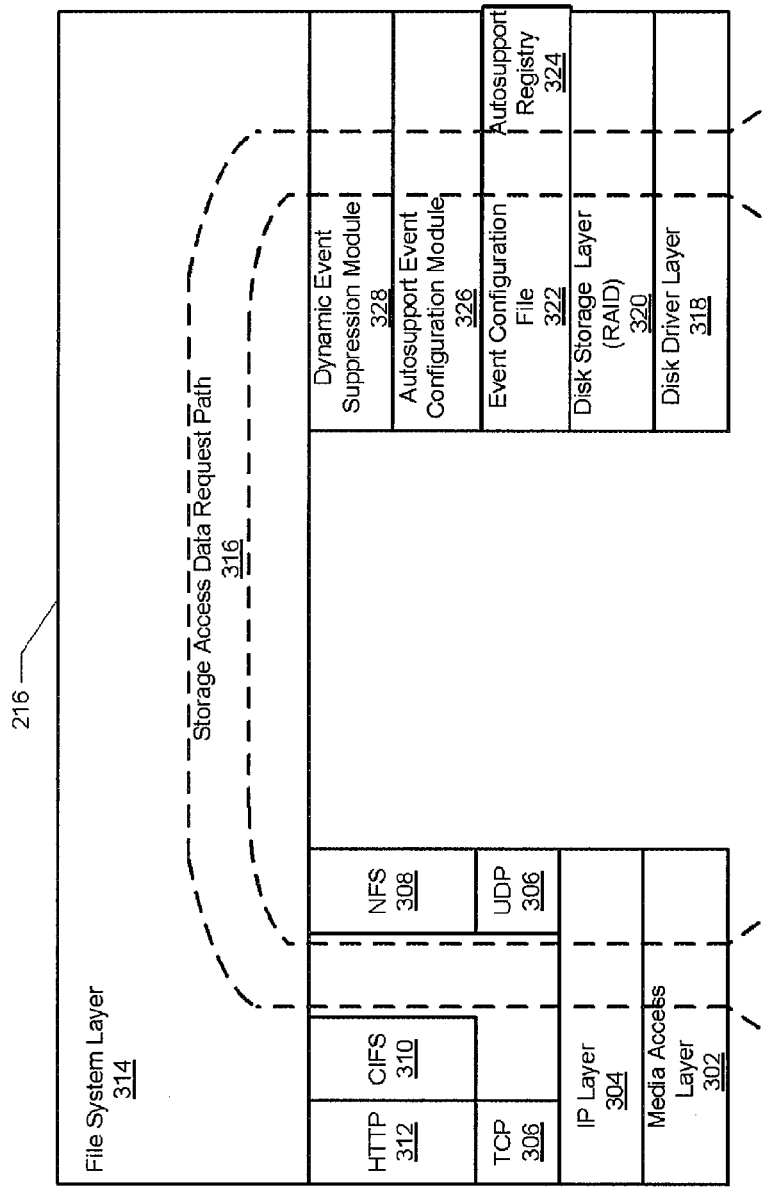
FIG. 3 an exemplary storage operating system is illustrated that implements one or more aspects of the present invention.

Referring to FIG. 3, an exemplary storage operating system 216 is illustrated that implements one or more aspects of the present invention. As previously described, the term "storage operating system" as used herein with respect to a storage system generally refers to the computer-executable code operable on a storage environment that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

It should be understood that the organization of the storage operating system illustrated in FIG. 3 represents only one possible implementation. Accordingly, it is contemplated that various aspects of this invention can be implemented using a variety of alternate storage operating system architectures. As shown in FIG. 3, the storage operating system 216 includes a series of software layers organized to form an integrated network protocol stack providing data paths for clients to access information stored on the storage system using file-access protocols.

The protocol stack includes a media access layer 302 of network drivers (e.g., an Ethernet driver) that interfaces to network communication and protocol layers, such as the Internet Protocol (IP) layer 304 and the transport layer 306 (e.g., TCP/UDP protocol). A file-access protocol layer provides multi-protocol data access and, to that end, includes support for the Hypertext Transfer Protocol (HTTP) protocol 312, the NFS protocol 308 and the CIFS protocol 310. In addition, the storage operating system 216 may include support for other protocols, including, but not limited to, the direct access file system (DAFS) protocol, the web-based distributed authoring and versioning (WebDAV) protocol, the Internet small computer system interface (iSCSI) protocol, and other functionally appropriate protocols. The storage operating system 216 also includes a disk storage layer 320 that implements a disk storage protocol, such as a RAID protocol and a disk driver layer 318 that implements a disk control protocol, such as the small computer system interface (SCSI).

Bridging the disk software layers with the network and file-system protocol layers is a file system layer 314 of the storage operating system 216. In one implementation, the file system layer 314 implements a file system having an on-disk format representation that is block-based using, e.g., 4-kilobyte (KB) data blocks and using Modes to describe the files.

An Mode is a data structure used to store information about a file, such as ownership of the file, access permission for the file, size of the file, name of the file, location of the file, etc. In response to receiving a client's file access request, file system layer 314 generates operations to load (retrieve) the requested data from storage devices if it is not resident in the storage system's "in-core" memory. An external file handle in the client request typically identifies a file or directory requested by the requesting client. Specifically, the file handle may specify a generation number, inode number and volume number corresponding to the client's requested data.

If the information is not resident in the filer's "in-core" memory, the file system layer 314 indexes into an inode file using the received inode number to access an appropriate entry and retrieve a logical volume block number. The file system layer 314 then passes the logical volume block number to the disk storage layer 320 (RAID), which maps that logical number to a disk block number and sends the latter to an appropriate driver (for example, an encapsulation of SCSI implemented on a fibre channel disk interconnection) of the disk driver layer 318. The disk driver accesses the disk block number from the storage devices and loads the requested data in memory for processing by the storage system. Upon completion of the request, the storage operating system 216 on the storage system returns a response (e.g., a conventional acknowledgement packet defined by the CIFS specification) to the client over the network.

It should be noted that the software "path" 316 through the storage operating system layers described above needed to perform data storage access for the client request received at the filer may alternatively be implemented in hardware or a combination of hardware and software. That is, in an alternate embodiment of the invention, the storage access request path 316 may be implemented as logic circuitry embodied within a field programmable gate array (FPGA) or an application specific integrated circuit (ASIC). This type of hardware implementation increases the performance of the file service provided by storage operating system 216 in response to a file system request packet issued by a client. Moreover, in another alternate embodiment of the invention, the processing elements of network adapter 208 and multi-port storage interface 204 in FIG. 2 may be configured to offload some or all of the packet processing and storage access operations, respectively, from processor 206 to thereby increase the performance of the file service provided by the storage system.

In accordance with aspects of the present invention, storage operation system 216 further implements a dynamic event suppression module 328. As described in further detail later herein, the dynamic event suppression module 328 is capable of suppressing the generation of event information deemed to be repetitive or redundant. For example, multiple entries in a log will occur when an event that occurs in the storage environment continues to occur over time without resolution. These multiple entries in the log may be identified by the dynamic event suppression module 328 as redundant or repetitive based upon a common identifier, error code or other common marker common to each log entry. The dynamic event suppression module 328 isolates a high frequency subset of these recurring events based on the log entries and reduces the amount of information generated for the event logs and Autosupport system.

Further, an Autosupport event configuration module 326 designed in accordance with aspects of the present invention also operates to further reduce the amount of event information stored in the event logs and transmitted to the Autosupport system. This aspect of the present invention uses predetermined configuration information stored in event configuration file 322 and Autosupport registry 324 to directly limit or suppress specific events named in advance. For example, the configuration file 322 or Autosupport registry 324 may be configured to turn-off the generation of certain event informiation or greatly limit the event information from being generated upon every occurrence of a particular event in the storage system.

Figure 4:
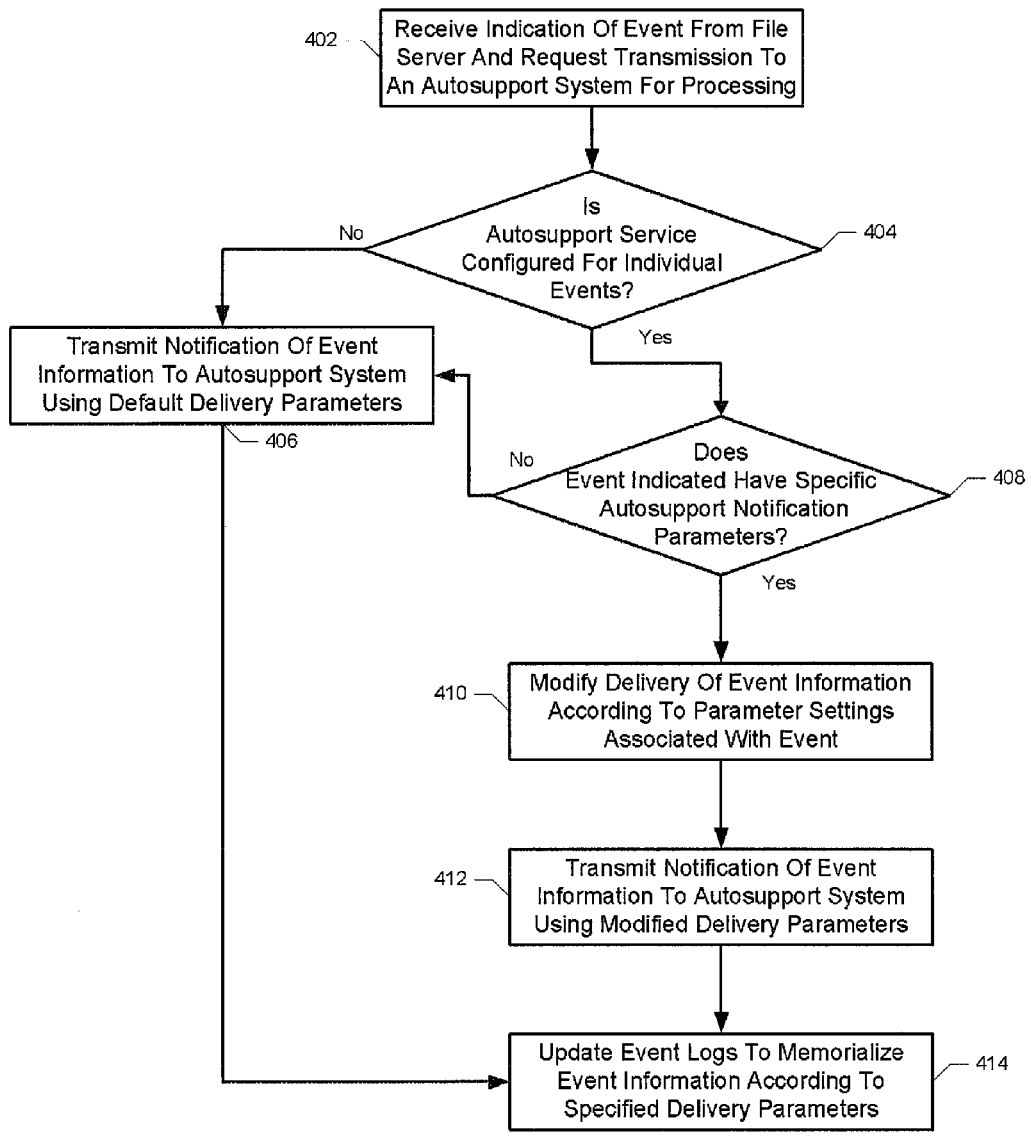
FIG. 4 is a flowchart diagram providing the operations for processing the generation of event information in accordance with one implementation of the present invention.

Referring to FIG. 4, a flowchart diagram provides the operations for configuring the generation of event information in accordance with one implementation of the present invention. Initially, an Autosupport client on the storage system receives an indication of an event from a subsystem on the storage system. Typically, the event indication includes a request to log the event information surrounding the occurrence of the event in an event log as well as transmit the event information to an Autosupport system (402). In many cases, the Autosupport system is remotely located over a network or the Internet and not on the storage system. However, the event log used to store the aggregate of the event information is generally stored locally on the storage system or in close proximity.

Once the initial indication is received, the storage system determines if the Autosupport client on the storage system has been configured to process individual events in addition to the default settings (404). This determination generally checks to see if either an event configuration file or Autosupport registry has been created and populated with configuration data. Depending on the implementation, the event configuration file (e.g., a text-based flat file) or an Autosupport registry (e.g., a compiled and indexed database) names one or more different events and lists various parameters for modifying the default processing of certain named events. In the absence of locating either the event configuration file or the Autosupport registry, aspects of the present invention will process events according to an overall default setting or strategy. For example, turning on Autosupport by default will cause all event information to be transmitted to an Autosupport system (406) and then entered in event logs (414) in the absence of an event configuration file or registry. The Autosupport by default can also be turned off but would necessarily neither store the event information in an event log nor transmit any event information to the Autosupport system (not illustrated).

Alternatively, the Autosupport client on the storage system next determines if the particular named event (402) has specific Autosupport notification parameters specified in either the event configuration file or Autosupport registry (408). Accordingly, if a particular named event cannot be located in a configuration file or Autosupport registry then the event is processed according to a default setting for the overall storage system (406) as previously described. However, if the event is named and located in the event configuration file or Autosupport registry then delivery of the event information is modified according to the parameter settings associated with the event (410). These parameter settings can explicitly indicate that no event information should be recorded or that a limited amount of event information should be processed and under certain conditions.

Essentially, the Autosupport client associated with the storage system may then transmit notification of the event information to the Autosupport system using the modified delivery parameters as configured (412). For example, the delivery parameters may limit how many times event information from the same named event can be transmitted in a particular time interval. Similarly, Autosupport clients will also update event logs with event information according to the parameters specified for the particular event (414).

FIG. 5 contains an excerpt of a configuration file having configurable parameter entries for a named event in accordance with one implementation of the present invention. In this example, the first field asuptrigger indicates the Autosupport event being configured. In this case asup.msg.cli.doit corresponds to events generated when the user manually issues autosupport.doit command with a command line interface (CLI). If the entry is shortened to asuptrigger=asup.msg then all Autosupport events with the asup.msg event prefix will be modified by the particular configuration parameters that follow.

In the next field, the configuration entry autosupport.support.to.content indicates the data content type that can be sent to the autosupport.support.to recipients. In this example, the data content types are: "none", which is interpreted to mean send nothing; "complete", which is interpreted to mean send detailed event information; "pager", which is interpreted to mean send a short text note. Consequently, the next field and entry autosupport.support.to.content=complete is interpreted to mean that a detailed autosupport message will be sent to the autosupport.support.to recipient.

The next field autosupport.support.to.timer indicates how often this Autosupport message should be sent to recipients named in the entry autosupport.support.to. For example, a value of 0 indicates that the Autosupport message should always be sent to autosupport.support.to recipients. A non-zero positive value instead indicates the time interval in seconds before posting the next similar Autosupport message to autosupport.support.to recipients. The difference between the current time and last time the same Autosupport event was generated is compared, and if the difference is greater than or equal to the timer interval for the event in autosupport.support.to.timer, then Autosupport event is posted.

Lastly the entries autosupport.to.content=complete and autosupport.to.timer=300 indicate that autosupport.content.to recipients will receive detailed Autosupport messages at a time interval of 300 seconds. Likewise, entries autosupport.noteto.content=pager and autosupport.noteto.timer=300 indicates that autosupport.noteto recipients should receive a shorter Autosupport note also at a time interval of 300 seconds.

Implementations of the present invention may additionally use dynamic event suppression to limit the amount of event information. It is contemplated that dynamic event suppression can be used in combination with the Autosupport client and parameters in the event configuration file as described above with respect to FIG. 3. For example, managing notification or transmission of events may take place according to specific delivery parameters setup for each particular event and a determination that the events are in either a high frequency subset of recurring events or a low frequency subset of recurring events.

Figure 6:
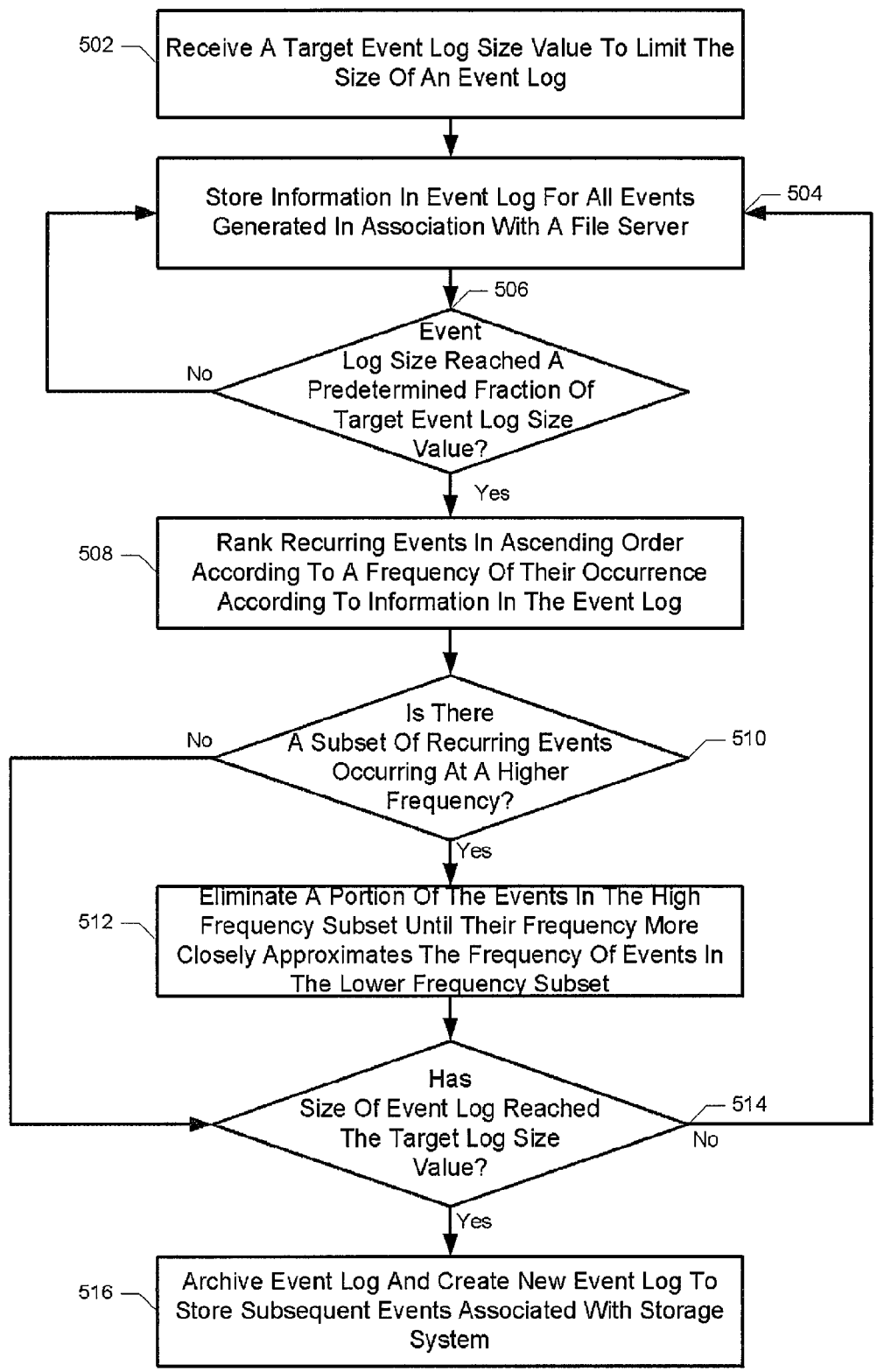
FIG. 6 is a flowchart diagram and of the operations for dynamic event suppression in accordance with one implementation of the present invention.

Accordingly, FIG. 6 is a block diagram and flowchart of the operations for dynamic event suppression in accordance with one implementation of the present invention. As a preliminary step, the dynamic event suppression operation receives a target event log size value to limit the size of an event log (502). For example, the dynamic event suppression may be configured with a default predetermined target event log size and later query a system administrator to modify the target event log size either interactively when setting up the dynamic event suppression processing or in a preferences setting area for the dynamic event suppression operation. The maximum value specified may vary depending on the installation details of the storage system and will operate as an upper limit of the size any event log file can become.

Next, the storage system gathers event information in response to the events. At first, the event information for all events is stored in an event log associated with the storage system (504). Little event information is discarded initially as the preliminary event information gathered determines which group of events should be dynamically suppressed.

Eventually, the dynamic event suppression operation determines if the event log size has reached a predetermined fraction of the target event log size value previously indicated (506). In one implementation, it may be sufficient to allow the events and event information stored in the event log to reach approximately 50% of the initial target event log size. Setting the predetermined fraction level low enough ensures that the event log does not rapidly fill-up to the maximum or target log size right away with potentially unwanted event information. For example, the dynamic event suppression operation will begin the process of eliminating or suppressing certain entries in a log file well before the number of log file entries become so large that the resulting log file is overly large and has too many entries to manipulate or even store further entries. However, the predetermined fraction level must also be set high enough to provide a statistically sufficient number of data points before applying the dynamic event suppression operation as described in further detail below. For example, setting the fraction level to over 50% means that dynamic event suppression operation will not be invoked until the number of entries in the event log reaches at least 50% of the target event log size allowable for the event log file. Accordingly, the final value for the predetermined fraction level may be set higher or lower depending on the particular storage system installation.

Once sufficient event information has been gathered, one implementation of the present invention ranks recurring events in ascending order according to a frequency of their occurrence (508). Recurring events captured in the event log may be the result of one or several applications or threads repeatedly detecting certain events and generating the same or similar event information. For example, an application may detect that a particular LUN has gone offline and generate corresponding event information every 15 seconds. These events would be grouped together as a single recurring event and ranked relative to other recurring events based on their frequency at the time of the ranking.

Next, the dynamic event suppression operation determines if there is a subset of the recurring events occurring at a higher frequency than other recurring events in the ranking (510). It is contemplated that there may be different approaches to separating high frequency recurring events from low frequency recurring events. In one implementation, high frequency recurring events can be measured relative to the frequency of the other recurring events and is described in further detail later herein with respect to FIG. 7 and FIG. 8. Alternatively, the high frequency recurring events may exceed an absolute predetermined threshold value. Low frequency recurring events would be classified accordingly if they are below the absolute threshold value. The absolute predetermined threshold value can be determined dynamically and may depend on the event frequency measurements associated with the highest and lowest recurring events. For example, the absolute predetermined threshold value may be selected as the mean or median frequency value from all the recurring events. It is also possible that aspects of the invention cannot adequately classify the recurring events as occurring at a higher or lower frequency. For example, the recurring events may occur with approximately the same frequency. In this latter, case it is possible that an immediate determination of the event log size is made (514) and event elimination operations are not performed (516).

Once identified, aspects of the present invention eliminate a portion of the events and/or event information associated with the high frequency subset of events. Events from the high frequency subset of events are suppressed or eliminated until the frequency of events in the high frequency subset closely approximates the frequency of events in the low frequency subset of recurring events (512). In one implementation, a random number generator (RNG) function is used to select individual events from the high frequency subset of recurring events. This approach tends to optimally reduce the most redundant event information while not entirely eliminating the event information from consideration in the subsequent analysis. For example, if three different events are occurring at a high frequency in the system then aspects of the present invention will attempt to eliminate several, but not all, entries in the log associated with each of the three events. Use of the RNG helps to ensure that redundant entries in the log associated with each of the three events are reduced without being completely eliminated.

Alternative implementations may eliminate a portion of events in the higher frequency subset until the frequency of events in the higher frequency subset approximates a predetermined proportion of the frequency of events in the lower frequency subset. For example, aspects of the present invention may reduce the higher frequency subset from 20,000 entries in the event log to only 10,000 entries based upon a 2× multiple of the 5,000 event entries from the lower frequency subset of recurring events.

The dynamic suppression operation effectively reduces the difference in frequency between the low frequency subset and high frequency subset of recurring events. If the event log has been sufficient reduced and/or has not reached the target log size value (514) then additional event information may be added to the log as events occur in the storage environment or storage system (504). Despite attempts to suppress the recurring events, if the size of the event log does eventually reach the target log size value then aspects of the present invention will archive the event log and create a new event log to store subsequent events associated with the storage environment or storage system (516). In this latter case, conventional methods of archiving or eliminating an event log may be implemented and include log tailing, rotating log files or aging the logs with a first-in-first-out (FIFO) type queue.

Figure 7:
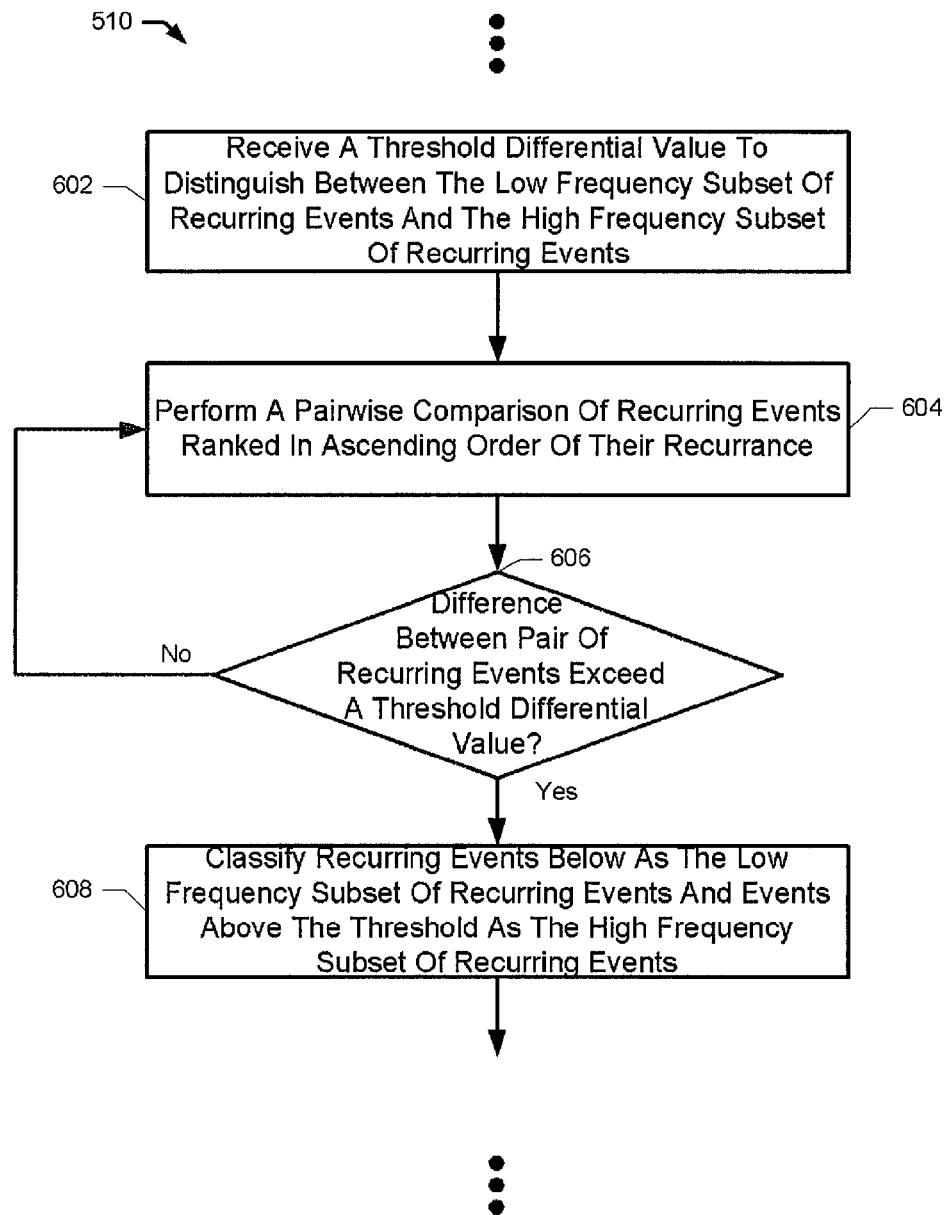
FIG. 7 is another flow chart diagram of the operations used by one implementation of the present invention to identify a high frequency subset of recurring events suitable for dynamic event suppression.

FIG. 7 is another flow chart diagram of the operations used by one implementation of the present invention to identify a high frequency subset of recurring events suitable for dynamic event suppression. In this example, the dynamic suppression operation first receives a threshold differential value to distinguish between the low frequency subset of recurring events and the high frequency subset of recurring events (602). Essentially, the threshold differential value can be specified on a percentage basis as a minimum difference between the two sets of recurring events. For example, this minimum threshold differential value may be set to 30% or any other value as deemed suitable under the circumstances. For example, the lower frequency subset of recurring events may only occur 300 times during a time interval and the higher frequency occurring events may occur at a frequency of approximately 30% higher rate or 390 occurrences or more during a time interval. Next, one implementation of the present invention performs a pairwise comparison of the recurring events ranked in ascending order of their frequency of recurrence (604). Ranking the recurring events in sequence ensures the largest gap between lower and higher recurring events will be readily identified.

The dynamic event suppression operation determines if the comparison reveals a sufficient difference in the frequency of the recurring events. If the difference does not exceed the threshold differential value or percentage then the next pair of recurring events in the ranking are compared (606—No). This continues until the pairwise comparison indicates a difference that exceeds the threshold differential value (606—Yes). One implementation of the present invention then classifies recurring events at or below the lower recurring frequency of events as the low frequency subset of recurring events. For example, events occurring less than or equal 23 in FIG. 8A during a time interval may be classified as occurring at a lower frequency while those occurring at greater than 23 may be classified as higher frequency. The recurring events above the lower recurring frequency of events are all classified as included in the higher frequency subset of recurring events. While it is not illustrated explicitly, it is also possible that no comparison exceeds the threshold differential value and the recurring events cannot be classified as either higher or lower recurring events.

Figure 8A:
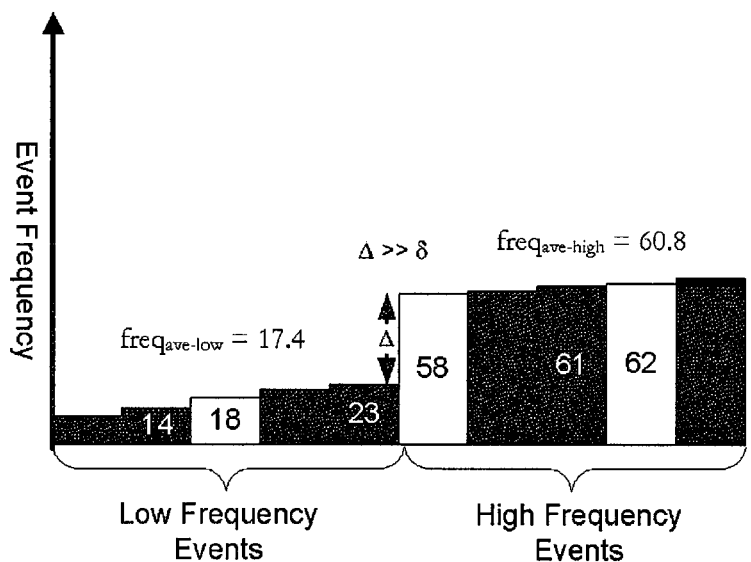
FIGS. 8A and 8B graphically illustrate the dynamic suppression and elimination of event information in accordance with one implementation of the present invention.
Figure 8B:
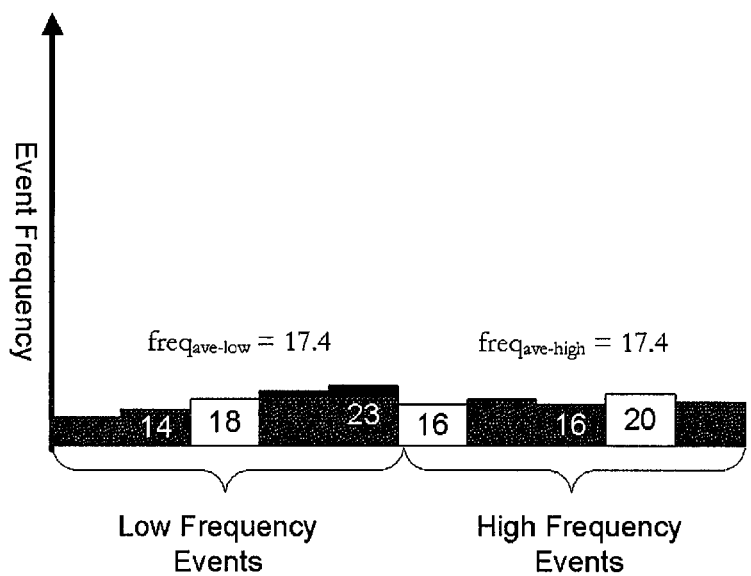

FIGS. 8A and 8B graphically illustrates the dynamic suppression and elimination of event information in accordance with one implementation of the present invention. In FIG. 8A a bar chart plots event frequency along a vertical axis and enumerates the recurring named events along the horizontal axis. It can be see that the recurring events are ordered in increasing frequency as follows: 11, 14, 18, 21, 23, 58, 59, 61, 62, and 64. In this example, the symbol $\delta$ represents the threshold differential value. In one implementation, a graphical user interface (GUI) tool displays these graphs illustrated in FIG. 8A and FIG. 8B as part of a suite of tools for managing the event logs associated with a storage environment, computer or other computer-like systems. The GUI tool for managing the event logs can graphically illustrate how much of the information in the logs have been eliminated or suppressed in accordance with aspects of the present invention.

As illustrated in FIG. 8A, the differential in the recurring frequency is largest between 23 and 58 and represented by $\Delta$. Assuming $\Delta$ is at least greater than $\delta$, aspects of the present invention would then classify recurring events with frequencies 11, 14, 18, 21, and 23 as low frequency events and recurring events with frequencies 58, 59, 61, 62 and 64 as high frequency events. The average frequency of the low frequency events is 17.4 ($freq_{ave-low}$=17.4) and the average frequency of the high frequency events is 60.8 ($freq_{ave-high}$=60.8)

In accordance with one implementation of the present invention, events are randomly eliminated in the subset of events associated with the high frequency events until the $freq_{ave-low} \cong freq_{ave-high}$. In this example, the random elimination of events in the high frequency events results in a new set of frequencies of: 16, 18, 16, 20, and 17 as illustrated in FIG. 8B. By eliminating these events, the average frequency in the high frequency events closely approximates the average frequency in the low frequency events and the event information is effectively and efficiently suppressed.

In general, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage environment, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs (application specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents. For example, implementations of the present invention suggest using an average frequency of events to consider as part of criteria for eliminating events. However, there are many other measurements of frequency and approaches to eliminating the recurring events from the group of recurring events classified as recurring with a higher frequency. Also, it is contemplated that there are other methods of dividing or classifying the recurring events into low frequency and high frequency recurring events other than those proposed and described above. Furthermore, aspects of the present invention are described in conjunction with an Autosupport system however it is contemplated that various implementations can be used with many different types of support systems and to manage logs of event information stored on local storage systems, remote storage systems, computers and many other devices that may create event logs to track events.

This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of dynamic suppression of notification of events associated with a storage environment, the method comprising:
   identifying one or more predetermined specific events for dynamic suppression of notification;
   designating event information for an event of the one or more predetermined specific events as redundant;
   limiting notification of the event of the one or more predetermined specific events if event information for the event of the one or more specific events is designated as redundant, wherein a portion of the event information for the event of the one or more predetermined specific events is limited without entirely eliminating the event information for the event of the one or more predetermined specific events;
   grouping events of the one or more specific events as recurring event groups, wherein a recurring event group of the recurring event groups is provided for each recurring event of the one or more predetermined specific event; and
   ranking the recurring event groups relative to each other based on their frequency at a time of the ranking.

2. The method of claim 1, wherein the identifying one or more predetermined specific events for dynamic suppression of notification comprises:
   naming the one or more predetermined specific events in an event configuration file.

3. The method of claim 2, wherein the event configuration file indicates conditions under which event notifications for the one or more predetermined specific events named therein are to be limited.

4. The method of claim 2, wherein the event configuration file includes one or more attributes for delivering information associated with a respective event of the one or more predetermined specific events, the one or more attributes for delivering information including an attribute selected from the group consisting of no delivery, time-delayed delivery, delivery during system start, delivery during system shutdown, and delivery when requested by a user.

5. The method of claim 1, wherein the designating event information as redundant comprises:
   determining how many times the event of the one or more predetermined specific events has occurred in a particular time interval.

6. The method of claim 1, wherein the limiting notification of the event of the one or more predetermined specific events comprises:
   eliminating a portion of the event information associated with the event of the one or more predetermined specific events designated as redundant.

7. The method of claim 1, wherein the storage environment comprises a type of storage selected from a set of storage types consisting of a storage area network (SAN), network attached storage (NAS), a stripe storage type, a replication storage type, and a single physical unit storage type.

8. The method of claim 1, wherein the event is generated by one or more applications processing data and monitoring events on the storage environment.

9. A method of dynamic suppression of notification of events associated with a storage environment, the method comprising:
   identifying one or more predetermined specific events for dynamic suppression of notification;
   designating event information for an event of the one or more predetermined specific events as redundant;
   limiting notification of the event of the one or more predetermined specific events if event information for the event of the one or more specific events is designated as redundant, wherein a portion of the event information for the event of the one or more predetermined specific events is limited without entirely eliminating the event information for the event of the one or more predetermined specific events; and suppressing notification of the event of the one or more predetermined specific events designated as redundant until a frequency of event notification for the event of the one or more predetermined specific events approximates a frequency of another event of the one or more predetermined specific events.

10. A system for dynamic suppression of notification of events associated with a storage environment, the system comprising:

an event configuration file identifying one or more predetermined specific events for dynamic suppression of notification; and a dynamic event suppression module comprises a software layer disposed in a network protocol stack providing data paths for clients to access information stored on the storage environment using file-access protocols, the dynamic event suppression module operable to designate event information for an event of the one or more predetermined specific events as redundant and to limit notification of the event of the one or more predetermined specific events if event information for the event of the one or more specific events is designated as redundant, wherein a portion of the event information for the event of the one or more predetermined specific events is limited without entirely eliminating the event information for the event of the one or more predetermined specific events.

11. The system of claim 10, wherein the event configuration file comprises information regarding conditions under which event notifications for the one or more predetermined specific events named therein are to be limited.

12. The system of claim 10, wherein the event configuration file includes delivery information associated with a respective event of the one or more predetermined specific events, the delivery information including an attribute selected from the group consisting of no delivery, time-delayed delivery, delivery during system start, delivery during system shutdown, and delivery when requested by a user.

13. The system of claim 10, wherein the dynamic event suppression module is operable to determine how many times the event of the one or more predetermined specific events has occurred in a particular time interval to designate the event information as redundant.

14. The system of claim 10, wherein the dynamic event suppression module is operable to group events of the one or more specific events as recurring event groups and to rank the recurring event groups relative to each other based on their frequency at a time of the ranking to designate the event information as redundant, wherein a recurring event group of the recurring event groups is provided for each recurring event of the one or more predetermined specific event.

15. The system of claim 10, wherein the dynamic event suppression module is operable to eliminate a portion of the event information associated with the event of the one or more predetermined specific events designated as redundant to limit notification of the event of the one or more predetermined specific events.

16. The system of claim 10, wherein the storage environment comprises a type of storage selected from a set of storage types consisting of a storage area network (SAN), network attached storage (NAS), a stripe storage type, a replication storage type, and a single physical unit storage type.

17. The system of claim 10, wherein the event is generated by one or more applications processing data and monitoring events on the storage environment.

18. A system for dynamic suppression of notification of events associated with a storage environment, the system comprising:

an event configuration file identifying one or more predetermined specific events for dynamic suppression of notification; and a dynamic event suppression module operable to designate event information for an event of the one or more predetermined specific events as redundant and to limit notification of the event of the one or more predetermined specific events if event information for the event of the one or more specific events is designated as redundant, wherein a portion of the event information for the event of the one or more predetermined specific events is limited without entirely eliminating the event information for the event of the one or more predetermined specific events, and the dynamic event suppression module is operable to suppress notification of the event of the one or more predetermined specific events designated as redundant until a frequency of event notification for the event of the one or more predetermined specific events approximates a frequency of another event of the one or more predetermined specific events to limit notification of the event of the one or more predetermined specific events.

19. A method of dynamic suppression of notification of events associated with a storage environment, the method comprising:

providing an event configuration file identifying one or more predetermined specific events for dynamic suppression of notification, wherein the event configuration file indicates conditions under which event notifications for the one or more predetermined specific events named therein are to be limited;

designating event information for an event of the one or more predetermined specific events as redundant;

limiting notification of the event of the one or more predetermined specific events if event information for the event of the one or more specific events is designated as redundant by eliminating a portion of the event information associated with the event of the one or more predetermined specific events designated as redundant without entirely eliminating the event information for the event of the one or more predetermined specific events;

grouping events of the one or more specific events as recurring event groups, wherein a recurring event group of the recurring event groups is provided for each recurring event of the one or more predetermined specific event; and ranking the recurring event groups relative to each other based on their frequency at a time of the ranking.

20. The method of claim 19, wherein the event configuration file includes one or more attributes for delivering information associated with a respective event of the one or more predetermined specific events, the one or more attributes for delivering information including an attribute selected from the group consisting of no delivery, time-delayed delivery, delivery during system start, delivery during system shutdown, and delivery when requested by a user.

21. The method of claim 19, wherein the designating event information as redundant comprises:

determining how many times the event of the one or more predetermined specific events has occurred in a particular time interval.

22. A method of dynamic suppression of notification of events associated with a storage environment, the method comprising:

providing an event configuration file identifying one or more predetermined specific events for dynamic suppression of notification, wherein the event configuration file indicates conditions under which event notifications for the one or more predetermined specific events named therein are to be limited;

designating event information for an event of the one or more predetermined specific events as redundant;

limiting notification of the event of the one or more predetermined specific events if event information for the event of the one or more specific events is designated as redundant by eliminating a portion of the event information associated with the event of the one or more predetermined specific events designated as redundant without entirely eliminating the event information for the event of the one or more predetermined specific events; and suppressing notification of the event of the one or more predetermined specific events designated as redundant until a frequency of event notification for the event of the one or more predetermined specific events approximates a frequency of another event of the one or more predetermined specific events.

\* \* \* \* \*